Jan. 8, 1957 J. R. ORELIND 2,776,613
TRACTOR ATTACHING STRUCTURE
Filed Feb. 25, 1953 3 Sheets-Sheet 1
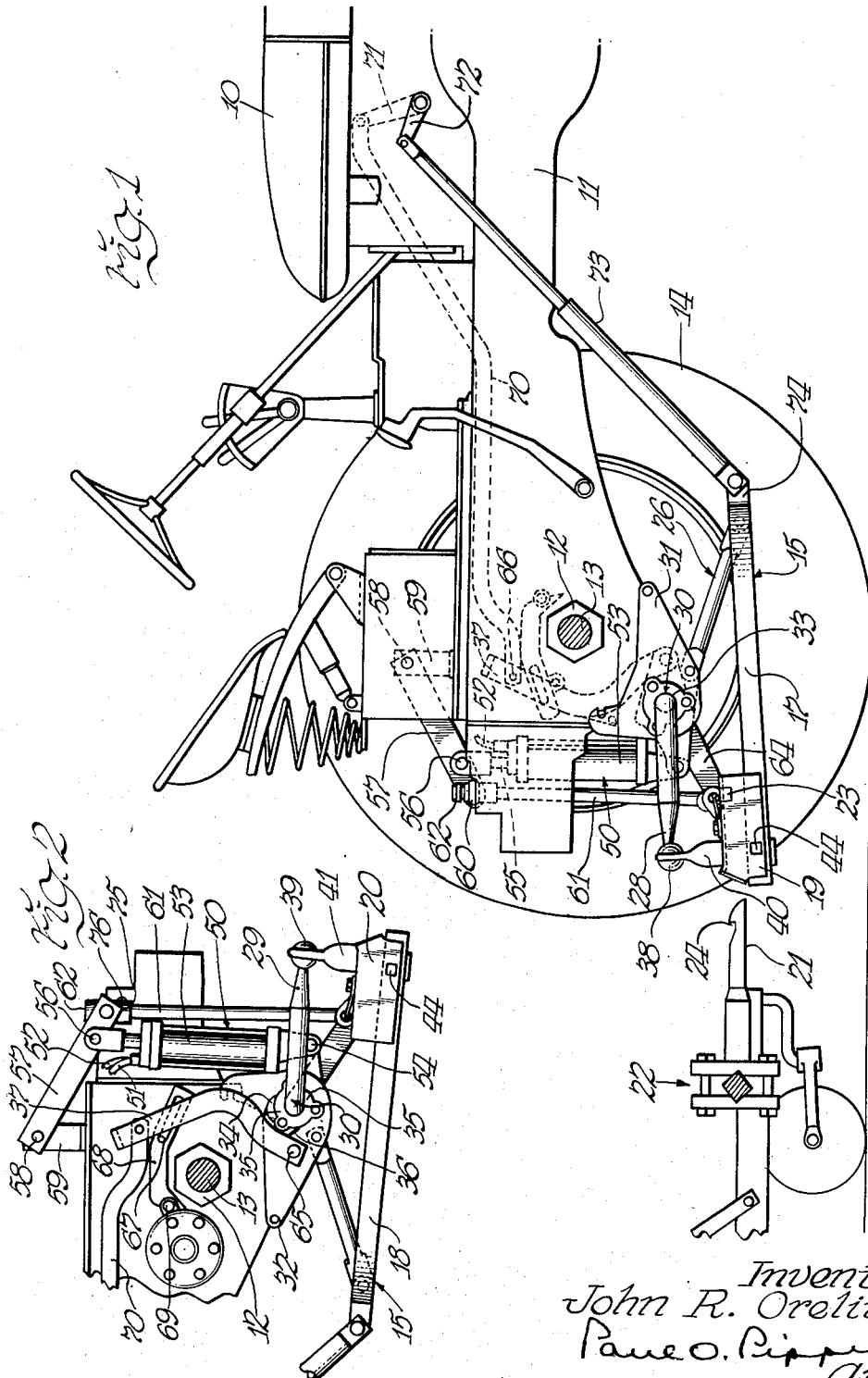
Inventor
John R. Orelind
Paul O. Pippe
Atty.

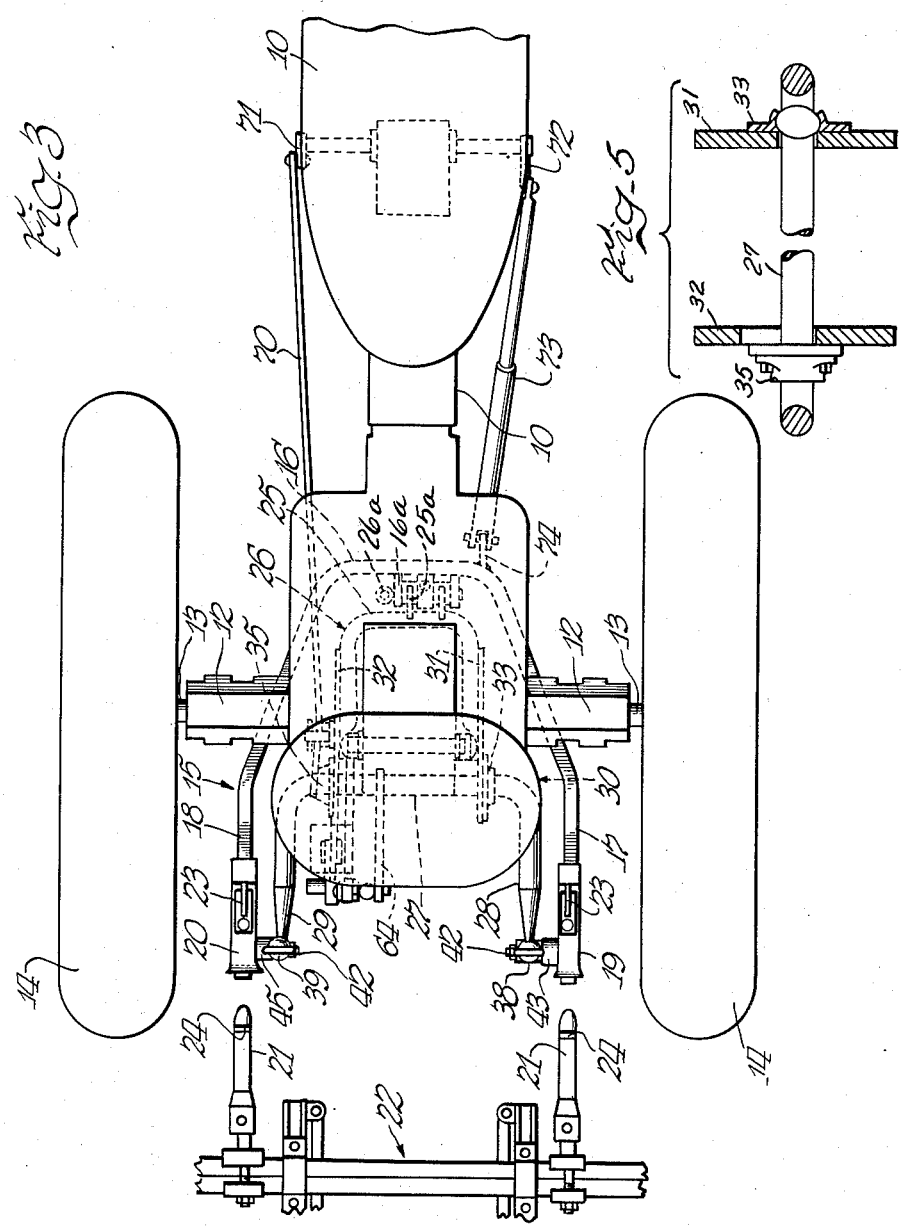

Jan. 8, 1957  J. R. ORELIND  2,776,613
TRACTOR ATTACHING STRUCTURE
Filed Feb. 25, 1953  3 Sheets-Sheet 3
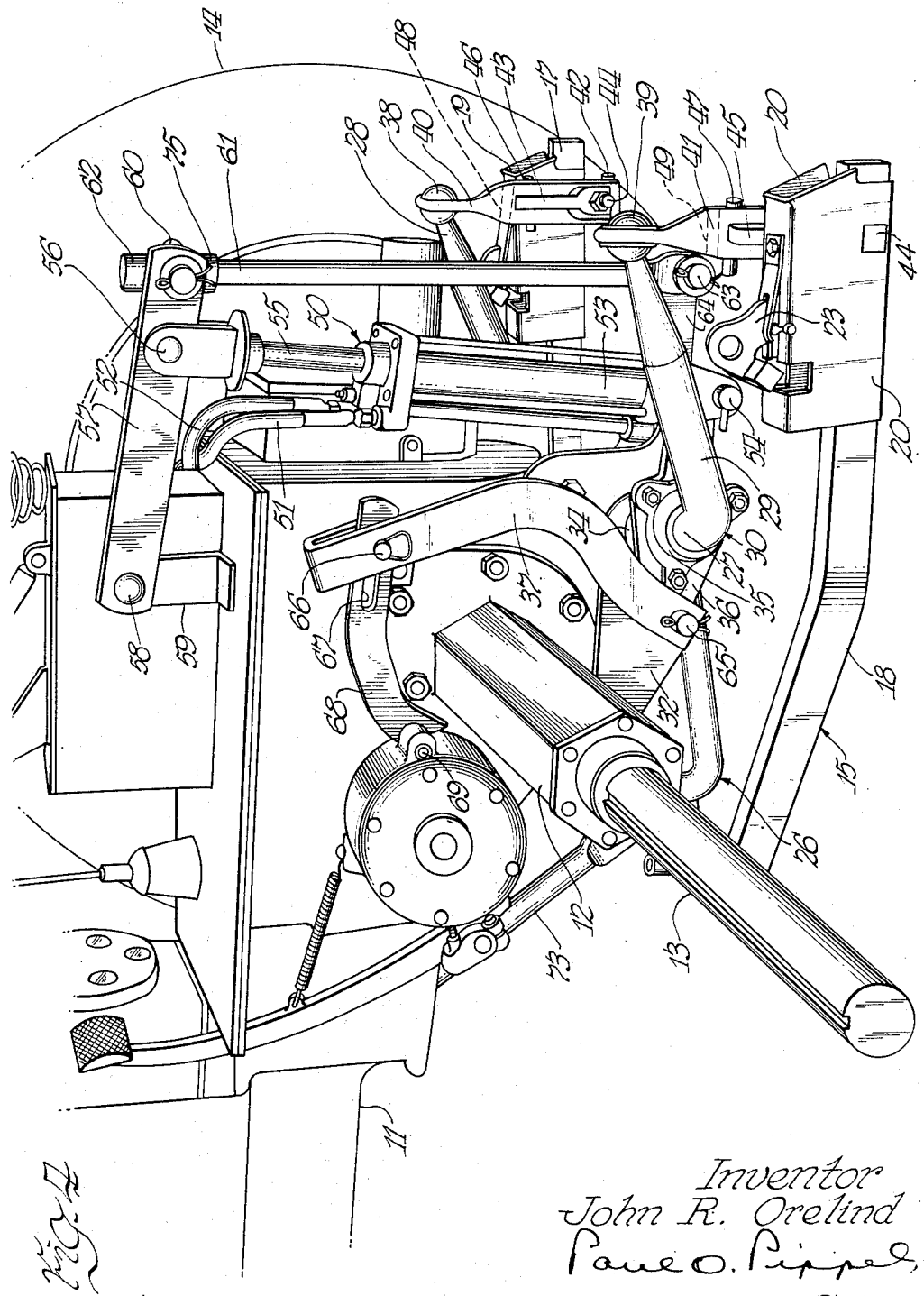
Inventor
John R. Orelind
Paul O. Pippel,
Atty.

United States Patent Office

2,776,613
TRACTOR ATTACHING STRUCTURE

John R. Orelind, Wilmette, Ill., assignor to International Harvester Company, a corporation of New Jersey Application February 25, 1953, Serial No. 338,651

15 Claims. (Cl. 97—46.59)

The invention relates to implement attaching mechanism for tractors and particularly to improved hitch mechanism for facilitating the connection of an implement to a tractor, and the control thereof.

An object of the invention is the provision of a hitch structure for a tractor particularly adapted for the attachment of different kinds of implements to the tractor.

Another object of the invention is the provision of improved tractor attaching mechanism for implements including novel means for leveling the implement and for accommodating relative movement between opposite ends of an implement to assist it in following ground contour.

Another object of the invention is the provision of implement attaching mechanism for a tractor wherein improved lifting mechanism is provided including a novel mounting for a power lifting rock shaft.

Another object of the invention is the provision in implement attaching mechanism for a tractor of a transverse rock shaft having one end thereof mounted for free vertical floating movement relative to the other, and wherein optional means are provided for adjustably holding said end of the rock shaft in a fixed position.

Other objects and advantages of the invention will become clear from the following detailed description when read in conjunction with the accompanying drawings, wherein:

Figure 1 is a view in side elevation, partly in section, of the rear end of a tractor, with one wheel removed, having mounted thereupon an implement attaching hitch structure incorporating the features of this invention;

Figure 2 is a detail view of a portion of the structure shown in Figure 1 from the other side of the tractor;

Figure 3 is a plan view of the tractor hitch shown in Figure 1;

Figure 4 is a perspective view of the implement attaching structure of this invention showing the free end of the lifting rock shaft mounted for floating movement; and Figure 5 is an enlarged detail, partly in section, illustrating the universal bearing and slot structure for mounting the rockshaft.

Referring to the drawings, it will be observed that the numeral 10 designates the longitudinally extending body of a tractor having a power plant 11, a rear axle housing 12, transverse axle 13 and laterally spaced drive wheels 14.

The implement attaching structure of this invention includes a U-shaped drawbar 15 having a forward transverse portion 16 extending under the body of the tractor to a location forwardly of the rear axle thereof, and rearwardly extending laterally spaced arms 17 and 18. The rear ends of arms 17 and 18 have secured thereto, respectively, socket members 19 and 20. As indicated in Figure 1, each of these socket members is adapted to receive for sliding movement a complementary connecting shaft element 21 on an agricultural implement designated by the numeral 22. It may be understood that each of the members 21 receivable in the corresponding socket member 19 or 20 is locked therein by a latch 23 adapted for insertion in a groove 24 provided in the upper surface of the member 21. The particular construction of the socket members 19 and 20 forms no part of this invention and further details of the construction thereof may be had by reference to copending application Serial No. 338,652, filed February 25, 1953.

The transverse portion 16 of the drawbar 15 is connected to the transverse portion 25 of another U-shaped member 26, pivotally mounted upon the tractor body and extending forwardly therebelow, by means accommodating both vertical pivotal movement of the drawbar 15 as well as lateral swinging thereof. This means includes interlocking lugs 16a and 25a affixed to portions 16 and 25, respectively, and apertured to receive a transverse pin 26a, said apertures being large enough to provide a loose connection accommodating, in addition to the vertical and lateral swinging referred to, lateral tilting of the drawbar 15 about a longitudinal axis. Raising and lowering of the drawbar 15 about the pivotal connection thereof to the member 26 is accomplished by lifting mechanism including a transversely extending rock shaft 27 having its ends bent to provide laterally spaced rearwardly extending arms 28 and 29 and forming a lifting bail generally designated at 30.

The ends of the rock shaft 27 are supported in laterally spaced hangers 31 and 32 secured to the tractor body and depending therefrom. The right hand supporting bracket 31 is provided with a bearing 33 in which the right hand end of the shaft 27 is mounted for universal pivotal movement. The other end of the shaft is received in a generally vertically extending arcuate slot 34 provided in the left hand supporting bracket 32. The end of the shaft 27 projecting beyond the bracket 32 is mounted in a bearing 35 carried by a triangular plate member 36 to which is affixed, as by welding, the lower end of an arm 37.

The rear ends of the lift arms 28 and 29 are connected by ball and socket joints 38 and 39, respectively, to depending lift links 40 and 41. The lower end of link 40 is connected by a longitudinally extending pivot pin 42 to an upright member 43 mounted by a transverse pivot pin 44 on the right hand socket member 19. The left hand lifting link 41 is similarly connected to the left hand socket member 20 by a similar upright member 45.

At this point it should be clear that rocking of the lift arms 28 and 29 in a vertical plane by rocking the shaft 27, raises and lowers the drawbar 15 about its pivotal connection to the draft member 26. It should likewise be clear that the lift links 40 and 41 are capable of lateral and longitudinal swinging movement about the respective pivots 42 and 44. Lateral swinging of the links 40 and 41 and therefore of the drawbar 15 is prevented when desired by the provision of locking pins 46 and 47 receivable in the registering openings provided in the links 40 and 41 and the respective members 43 and 45, the pins 46 and 47 being optionally receivable in openings 48 and 49 in the links 40 and 41 to accommodate this lateral swinging of the drawbar.

Rocking of the shaft 27 to vertically move the rear end of the drawbar 15 to raise and lower the implement 22 upon receipt of the members 21 in the sockets 19 and 20 is accomplished by power operated mechanism comprising a ram unit 50 of the double acting type receiving fluid under pressure through hose lines 51 and 52 delivered from a pump, not shown, deriving power in any suitable manner from the tractor power plant and under the control of the tractor operator. The hydraulic system by which the ram 50 is actuated is preferably of a type accommodating extension and retraction of the ram unit in small increments and the maintenance thereof in a selected adjusted position.

The ram unit 50 comprises a cylinder 53 pivotally mounted at 54 upon an extension of the bracket 32 and extending generally vertically upwardly therefrom. A piston rod 55 slidable in the cylinder 53 is pivotally connected at 56 to a rockable member in the form of an arm or link 57 which, in turn, is pivotally mounted at 58 upon a bracket 59 affixed to the tractor body. Arm 57 extends rearwardly from the tractor and is provided at the end projecting beyond the pivotal connection thereof to the piston rod 55, with a swivel 60 which is apertured to slidably receive the upper end of a lift link or rod 61 having secured to its upper end a cap 62. The lower end of the rod 61 is pivotally connected at 63 to another rockable member in the form of a rock arm 64 affixed to the rock shaft 27 and extending rearwardly therefrom. Thus upon extension of the rod 55 in the cylinder 53 the link 57 is swung upwardly about its pivot 58 causing swivel 60 to engage the cap 62 on rod 61 and rock the arm 64 and shaft 27 to raise the drawbar 15 and implement connected thereto. Retraction of the piston rod and the cylinder 53 permits the drawbar and the implement to lower.

When an implement of the type extending transversely across the rear of the tractor and having ground engaging wheels thereon is mounted on the attaching structure of this invention, it is important that the ends of the implement be able to rise and fall relative to each other to accommodate the implement to changes in ground contour. For this purpose it is provided that the rock shaft 27 be allowed to pivot about the connection thereof to the right hand supporting bracket 31. This floating movement of the left hand end of the rock shaft is accommodated by the provision of the curved slot 34 in which the end of the rock shaft is mounted. The arm 37 which is secured to the plate 36 supporting the outer end of rock shaft 27 is pivotally mounted at 65 upon the supporting bracket 32 for longitudinal rocking movement. Rocking of arm 37 about its axis at 65 causes shaft 27 to move in the slot 34, which defines an arc about the axis 65. The upper end of arm 37 is provided with a pin 66 receivable in a slot 67 provided in a strap 68 pivotally mounted at 69 upon the tractor for free swinging relative thereto. Thus when vertical forces are exerted against the opposite sides of the drawbar 15 in response to changes in ground contour encountered by the implement, this force is transmitted to the left hand end of the rock shaft 27 to move it vertically in the arcuate slot 34. This is accommodated by the lost motion connection provided between the lift rod 61 and the swivel 60, the rod sliding upwardly in the swivel.

When control of the movement of the left hand end of rock shaft 27 is required, for leveling purposes and the like, the pin 66 is removed, severing the connection with the strap 68 and is optionally connected to the rear end of a longitudinally extending push rod 70, the forward end of which is pivotally connected to a power lift rock arm 71 mounted on the side of the tractor and rocked by power likewise derived from the tractor power plant.

On the other side of the tractor body and mounted coaxially with the rock arm 71 is another rock arm 72 which is connected by an adjustable link 73 to a lug 74 secured to the transverse portion 16 of the drawbar 15. Rock arm 72 may be rocked in any suitable manner independently of the rock arm 71 to raise and lower the forward end of the drawbar 15 for the purpose of adjusting the operating depth of the implement connected thereto. The swivel 60 is provided with an extension 75 and a pin 76 is receivable in apertures in the swivel and the rod 61, as indicated in Fig. 2, when desired, to prevent relative movement of the rod 61 and the link 57 and floating of the rock shaft 27. This is useful, for example, when it is desired to utilize the drawbar 15 as a jack to raise the rear end of the tractor, lowering of the rear end of the drawbar 15, under power derived through the ram unit 50, pressing against the ground and serving as the jack.

The operation of the implement attaching structure of this invention should be clear from the foregoing description. It should likewise be clear that modifications may be made in the invention without departing from the spirit thereof or the scope of the appended claims.

What is claimed is:

1. Apparatus for the integral connection to a tractive vehicle of an implement having laterally spaced longitudinally elongated attaching elements adapted to occupy a position above the ground when the implement is detached from the vehicle comprising a supporting member mounted on the vehicle and vertically adjustable relative thereto, laterally spaced longitudinally elongated attaching elements complementary to said implement attaching elements carried by said supporting member for simultaneous vertical adjustment therewith, lift means on the vehicle operatively connected to said supporting member for vertical adjustment thereof to a position in horizontal alignment with the said implement attaching elements, said vehicle attaching elements being adapted for relatively slidable cooperative association with the respective of said implement attaching elements upon advance of the vehicle to the implement, whereby the implement becomes an integral part of the vehicle and vertically movable with said complementary vehicle attaching elements, and means on the vehicle for tilting said supporting member about a longitudinal axis and for holding it in a selected adjusted position relative to the tractor to vary the vertical position of one of said vehicle attaching elements relative to the other to compensate for variations in the vertical positions of the respective of said implement attaching elements.

2. The invention set forth in claim 1, wherein the implement attaching elements are in the form of shafts, the supporting member is in the form of a U-shaped drawbar, and the vehicle attaching elements are in the form of elongated sockets adapted to telescopically and slidably receive the respective of said shafts.

3. An implement attaching structure for tractors, comprising a rigid drawbar having laterally spaced longitudinally elongated hitch elements at one end thereof slidably cooperable with complementary longitudinally elongated attaching elements on the implement to provide a stable integral connection between the tractor and implement, means connecting the other end of said drawbar to the tractor in draft-receiving relation, said connecting means including pivot means accommodating vertical swinging of the drawbar between positions corresponding to operating and transport positions of the implement and lateral tilting of the drawbar as a unit about a longitudinal axis relative to the tractor, lift means on the tractor operatively connected to said drawbar for simultaneously raising said hitch elements and the implement connected thereto as a unit upon actuation of the lift means, and means incorporated in the mounting of said lift means on the tractor accommodating free tilting of said drawbar about said longitudinal axis whereby the relative vertical positions of said hitch elements can vary to compensate for changes in ground contour encountered by the implement.

4. An implement attaching structure for tractors, comprising a rigid drawbar having laterally spaced longitudinally elongated hitch elements at one end thereof slidably cooperable with complementary longitudinally elongated attaching elements on the implement to provide a stable integral connection between the tractor and implement, means connecting the other end of said drawbar to the tractor in draft-receiving relation, said connecting means including pivot means accommodating vertical swinging of the drawbar between positions corresponding to operating and transport positions of the implement and lateral tilting of the drawbar as a unit about a longitudinal axis relative to the tractor, lift means on the tractor operatively connected to said drawbar for simultaneously raising said hitch elements and the implement connected thereto as a unit upon actuation of the lift means, means incorporated in the mounting of said lift means on the tractor accommodating free tilting of said drawbar about said longitudinal axis whereby the relative vertical positions of said hitch elements can vary to compensate for changes in ground contour encountered by the implement, and adjustable means on the tractor optionally operatively connectable to said drawbar to effect controlled tilting thereof about said longitudinal axis relative to the tractor and to hold the drawbar in a selected adjusted position.

5. An implement attaching structure for tractors, comprising a unitary hitch device pivotally connected to the tractor for vertical movement relative thereto and tilting about a longitudinal axis, a first adjustable means on the tractor operatively connected to said hitch device for effecting said vertical movement thereof, laterally spaced longitudinally elongated attaching members mounted on said hitch device for vertical movement therewith and adapted for slidable cooperation for a major part of their respective lengths with complementary longitudinally elongated attaching members on the implement to provide a stable integral connection between the tractor and the implement, said first adjustable means accommodating free vertical floating movement about said longitudinal axis of one of said attaching members on the hitch device relative to the other to compensate for changes in ground contour encountered during operation of the implement, and adjustable means on the tractor operable independently of said first mentioned adjustable means optionally operatively connectable to said hitch device to effect vertical adjustment of one of said attaching members relative to the other and to hold it in selected adjusted positions.

6. An implement attaching structure for tractors comprising laterally spaced longitudinally elongated hitch elements mounted on the tractor for vertical movement relative thereto and tilting about a longitudinal axis and slidably cooperable with complementary longitudinally elongated attaching elements on the implement to provide a stable integral connection between the tractor and implement, lift means on the tractor operatively connected to said hitch elements for simultaneously raising and lowering the latter and the implement connected thereto as a unit upon actuation of the lift means, said lift means including a rockshaft having operative connections to said hitch elements for raising and lowering the latter and the implement connected thereto upon rocking the shaft, means pivotally mounting one end of the rockshaft on the tractor, and means including lost motion for mounting the other end of the shaft on the tractor to accommodate limited vertical floating movement of the shaft about said pivot.

7. The invention set forth in claim 6, wherein means are provided on the tractor and optionally operatively connectable to said rockshaft to vertically adjust the latter about its pivot and to hold it in a selected adjusted position.

8. An implement attaching structure for a tractor, comprising a hitch device connected to the tractor for vertical movement relative thereto and for tilting about a longitudinal axis, laterally spaced longitudinally elongated socket-like members mounted on said hitch device for vertical movement therewith and adapted for slidable cooperation with complementary longitudinally elongated shaft-like members on the implement to provide a stable integral connection between the tractor and implement, lift means mounted on the tractor including a transverse rockshaft having laterally spaced lift arms affixed thereto, link means operatively connecting said arms to said socket-link members for raising and lowering the hitch device and the implement connected thereto as a unit upon rocking said shaft, and opposing relative vertical movement between said lift arms and said socket members, the mounting of one end of said rockshaft on the tractor including lost motion accommodating vertical movement of that end of the shaft and of the associated lift arm and socket-like member.

9. In an implement attaching structure for tractors wherein a draw-frame is mounted on the tractor by means accommodating vertical movement and lateral tilting about a longitudinal axis relative thereto and is provided with laterally spaced socket members for slidably receiving complementary laterally spaced shaft members on the implement, a transverse rock shaft having lift means thereon operatively connected to said socket members for raising and lowering the latter to a position to slidably receive said shaft members upon backing of the tractor to the implement, means for pivotally mounting one end of said rock shaft on the tractor, and means including a lost motion connection for mounting the other end of the rock shaft on the tractor, said lost motion connection accommodating vertical floating movement of the associated free end of the rock shaft about the pivotal connection of the other end thereof to the tractor.

10. The invention set forth in claim 9, wherein means are provided and optionally connectable to said rock shaft for adjusting the vertical position of the free end of said rock shaft and for holding it in selected adjusted positions.

11. An implement attaching structure for a tractor, comprising a hitch device connected to the tractor in draft-receiving relation by means accommodating vertical movement and lateral tilting about a longitudinal axis relative thereto and having laterally spaced attaching elements adapted for cooperation with complementary attaching elements on the implement, a transverse rock shaft on the tractor having laterally spaced rock arms thereon operatively connected to the hitch device for raising and lowering the implement in response to rocking of the shaft, supporting means on the tractor supporting the rock shaft at laterally spaced locations, one of said supporting means including lost motion accommodating generally vertical floating movement of the associated end of the shaft during operation of the implement to compensate for changes in ground contour, and the other supporting means including pivot means accommodating said floating movement of the other end of the shaft.

12. The invention set forth in claim 11, wherein the first mentioned supporting means for the rock shaft is provided with a generally vertically extending slot in which the associated end of the shaft is received and is movable.

13. The invention set forth in claim 11, wherein adjusting means is provided and optionally connectable to the floating end of said rock shaft for vertically moving the latter to and holding it in selected positions, whereby the hitch device and therefore the implement may be adjusted about a longitudinal axis.

14. An implement attaching structure for a tractor, comprising a hitch device pivotally connected to the tractor in draft-receiving relation for tilting about a longitudinal axis and having laterally spaced attaching elements adapted for cooperation with complementary attaching elements on the implement, a transverse rock shaft, laterally spaced supports on the tractor carrying said shaft, one of said supports having a generally vertically extending slot formed therein to receive one end of the rock shaft and accommodate vertical floating movement thereof, a lifting connection between the shaft and the hitch device for raising and lowering the implement upon rocking the shaft, a hydraulic cylinder anchored to the tractor extending vertically upwardly therefrom and having a piston rod slidable therein, a rock arm on said shaft, and a lifting link connected to said arm and extending vertically upwardly therefrom, and means operatively connecting said link to said piston rod for relative sliding movement to accommodate the said floating of the rock shaft.

15. The invention set forth in claim 14, wherein the lifting connection between the shaft and the hitch device includes laterally spaced lift arms mounted at the ends of said shaft and extending rearwardly therefrom, and vertically extending lift links connecting the lift arms to the hitch device, said lift links being laterally swingable to accommodate lateral swinging of the hitch device and implement, and optionally lockable to the hitch device to hold the latter against lateral swinging.

References Cited in the file of this patent
UNITED STATES PATENTS

| | | |
|---|---|---|
| 1,464,740 | Benjamin et al. | Aug. 14, 1923 |
| 2,337,638 | Brown | Dec. 28, 1943 |
| 2,352,491 | Orelind | June 27, 1944 |
| 2,363,292 | Brown | Nov. 21, 1944 |
| 2,386,378 | Wippel | Oct. 9, 1945 |
| 2,518,363 | Orelind | Aug. 8, 1950 |
| 2,564,034 | Seeger | Aug. 14, 1951 |
| 2,593,028 | Hendrick | Apr. 15, 1952 |
| 2,619,019 | Temple | Nov. 25, 1952 |
| 2,656,776 | Cox et al. | Oct. 27, 1953 |